(12) United States Patent
Umemoto et al.

(10) Patent No.: US 11,413,573 B2
(45) Date of Patent: Aug. 16, 2022

(54) AIR PURIFYING SYSTEM

(71) Applicant: KAWASAKI JUKOGYO KABUSHIKI KAISHA, Kobe (JP)

(72) Inventors: Katsuya Umemoto, Akashi (JP); Teruo Kishimoto, Kakogawa (JP); Kazuhiro Okumura, Kyoto (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 406 days.

(21) Appl. No.: 16/608,885

(22) PCT Filed: Apr. 25, 2018

(86) PCT No.: PCT/JP2018/016795
§ 371 (c)(1),
(2) Date: Oct. 28, 2019

(87) PCT Pub. No.: WO2018/199164
PCT Pub. Date: Nov. 1, 2018

(65) Prior Publication Data
US 2020/0086269 A1    Mar. 19, 2020

(30) Foreign Application Priority Data
Apr. 27, 2017  (JP) .............................. JP2017-087807

(51) Int. Cl.
*B01D 53/22*   (2006.01)
*F24F 3/147*   (2006.01)
(Continued)

(52) U.S. Cl.
CPC .............. *B01D 53/22* (2013.01); *F24F 3/147* (2013.01); *F24F 7/00* (2013.01); *F24F 7/08* (2013.01);
(Continued)

(58) Field of Classification Search
None
See application file for complete search history.

(56) References Cited

U.S. PATENT DOCUMENTS 6,540,818 B2 * 4/2003 Hachimaki ............ B01D 53/22
                                                                   95/52
2010/0105309 A1   4/2010 Ishibashi
(Continued)

FOREIGN PATENT DOCUMENTS

CN    102052713 A    5/2011
JP    H03-061198 A   3/1991
(Continued)

*Primary Examiner* — Jason M Greene
(74) *Attorney, Agent, or Firm* — Oliff PLC

(57) ABSTRACT

An air purifying system is a system for purifying air in a room, and the air purifying system includes: a carbon dioxide removing device including a first space and a second space that are divided from each other by a separation membrane that selectively allows carbon dioxide to permeate therethrough; a feed passage that leads the air in the room to the first space; a return passage that leads purified air from which carbon dioxide has been removed from the first space to the room; a supply passage that supplies sweep gas to the second space, the sweep gas having a carbon dioxide partial pressure that is lower than a carbon dioxide partial pressure in the air in the room; and a discharge passage that discharges the sweep gas from the second space after the sweep gas is mixed with the carbon dioxide that has permeated through the separation membrane.

3 Claims, 2 Drawing Sheets

(51) Int. Cl.
*F24F 7/00* (2021.01)
*F24F 7/08* (2006.01)
*F24F 110/70* (2018.01)

(52) U.S. Cl.
CPC ..... *B01D 2053/221* (2013.01); *F24F 2110/70* (2018.01)

(56) References Cited

U.S. PATENT DOCUMENTS

| | | | |
|---|---|---|---|
| 2011/0289955 | A1 | 12/2011 | Okano |
| 2012/0003916 | A1* | 1/2012 | Iwase ........................ F24F 7/10 454/239 |
| 2013/0074688 | A1 | 3/2013 | Straub et al. |
| 2014/0157985 | A1* | 6/2014 | Scovazzo ............... B01D 53/22 95/52 |
| 2014/0165838 | A1* | 6/2014 | Suzuki ................. B01D 53/228 96/13 |
| 2014/0377156 | A1* | 12/2014 | Okada ................. B01D 53/228 252/184 |
| 2020/0171427 | A1* | 6/2020 | Ishibashi ............... B01D 53/22 |

FOREIGN PATENT DOCUMENTS

| | | |
|---|---|---|
| JP | 2003-025991 A | 1/2003 |
| JP | 2010-120496 A | 6/2010 |
| JP | 5039293 B2 | 10/2012 |
| WO | 2008/136215 A1 | 11/2008 |
| WO | 2013/118776 A1 | 8/2013 |
| WO | 2017/065215 A1 | 4/2017 |

\* cited by examiner

AIR PURIFYING SYSTEM

TECHNICAL FIELD

The present invention relates to an air purifying system for purifying the air in a room.

BACKGROUND ART

In a building, a transport vehicle, etc., a room that accommodates a person or persons requires ventilation in order to suppress increase in the carbon dioxide concentration in the room. Such a room is also provided with an air conditioner that performs heating or cooling of the room.

The amount of ventilation required for suppressing increase in the carbon dioxide concentration in the room is relatively large, which results in a high air conditioner load. In recent years, in order to lower the air conditioner load, it has been proposed to purify the air in a room by removing carbon dioxide from the air.

For example, Patent Literature 1 discloses an air purifying system installed in a railcar. In the air purifying system, a circulation passage that circulates the air in a room is provided with a carbon dioxide removing device. The carbon dioxide removing device includes a separation membrane that selectively allows carbon dioxide to permeate therethrough. Also, in order to make a pressure difference between the circulation passage side of the separation membrane (i.e., one of the spaces that are divided from each other by the separation membrane) and the permeation side of the separation membrane (the other one of the spaces that are divided from each other by the separation membrane), a decompression pump for drawing a vacuum on the permeation side of the separation membrane is connected to the carbon dioxide removing device.

CITATION LIST

Patent Literature

PTL 1: Japanese Laid-Open Patent Application Publication No. 2003-25991

SUMMARY OF INVENTION

Technical Problem

However, in the case of using such a vacuum-drawing pump, a relatively large amount of electric power is required for driving the pump.

In view of the above, an object of the present invention is to realize an air purifying system capable of purifying the air in a room without using a vacuum-drawing pump.

Solution to Problem

In order to solve the above-described problems, an air purifying system according to the present invention is a system for purifying air in a room, and the air purifying system includes: a carbon dioxide removing device including a first space and a second space that are divided from each other by a separation membrane that selectively allows carbon dioxide to permeate therethrough; a feed passage that leads the air in the room to the first space; a return passage that leads purified air from which carbon dioxide has been removed from the first space to the room; a supply passage that supplies sweep gas to the second space, the sweep gas having a carbon dioxide partial pressure that is lower than a carbon dioxide partial pressure in the air in the room; and a discharge passage that discharges the sweep gas from the second space after the sweep gas is mixed with the carbon dioxide that has permeated through the separation membrane.

According to the above configuration, the first space and the second space are divided from each other by the separation membrane, and a pressure difference occurs between the carbon dioxide partial pressure in the first space and the carbon dioxide partial pressure in the second space. As a result, carbon dioxide in the air led to the first space selectively permeates through the separation membrane. This makes it possible to purify the air in the room without using a vacuum-drawing pump.

For example, the sweep gas may be outside air.

The air purifying system may further include: an air conditioner provided in the room, the air conditioner performing heating and cooling; a first ventilation passage that supplies the outside air to the room; a second ventilation passage that discharges air from the room; and a heat exchanger that performs sensible heat exchange between the air that flows through the second ventilation passage and the sweep gas that flows through the supply passage. According to this configuration, by the sensible heat exchange performed by the heat exchanger, the temperature of the sweep gas supplied to the second space can be brought close to the temperature of the air in the room. Consequently, sensible heat exchange via the separation membrane can be suppressed.

The heat exchanger may perform not only the sensible heat exchange, but also latent heat exchange. According to this configuration, if the separation membrane allows not only carbon dioxide but also water vapor to permeate therethrough, the humidity of the air in the room can be suppressed from changing between before and after carbon dioxide is removed from the air in the room.

The supply passage may be branched off from the return passage, and the sweep gas may be the purified air. According to this configuration, part of the purified air flowing out of the carbon dioxide removing device is utilized as the sweep gas. This makes it possible to simplify the configuration.

Advantageous Effects of Invention

The present invention makes it possible to purify the air in a room without using a vacuum-drawing pump.

DESCRIPTION OF EMBODIMENTS

Embodiment 1

Figure 1:
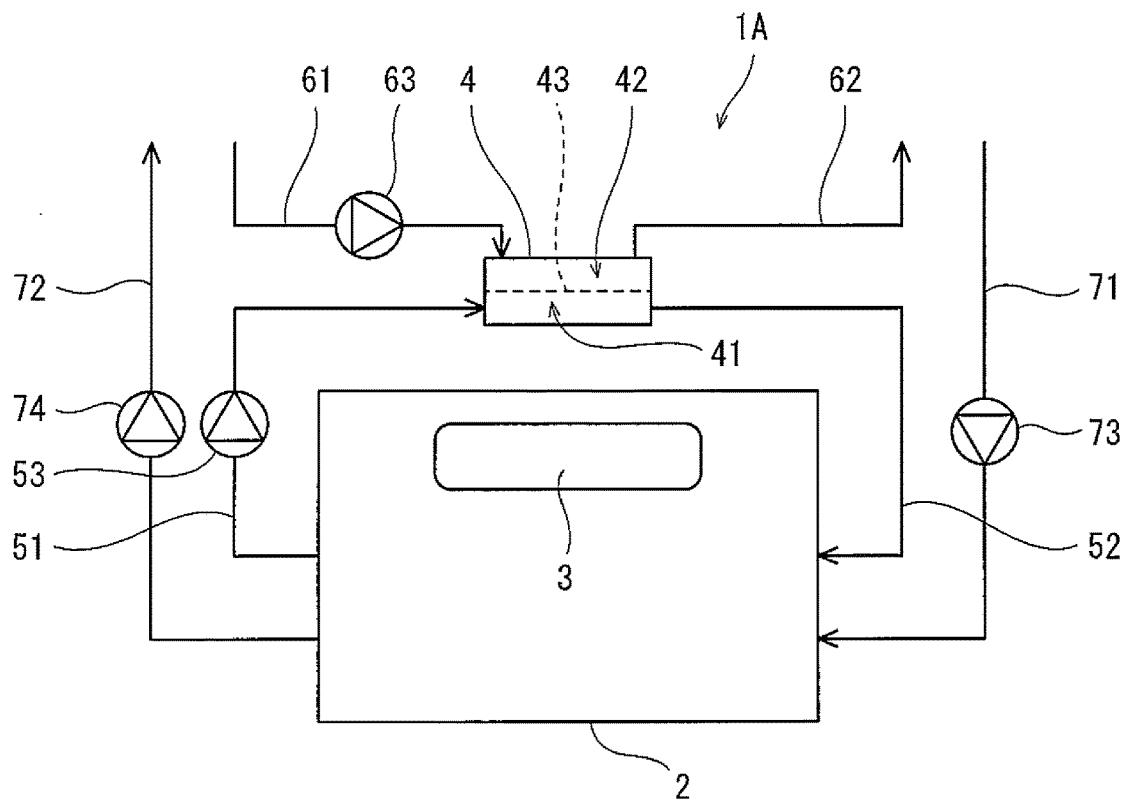
FIG. 1 shows a schematic configuration of an air purifying system according to Embodiment 1 of the present invention.

FIG. 1 shows an air purifying system 1A according to Embodiment 1 of the present invention. The air purifying system 1A purifies the air in a room 2, which accommodates a person or persons.

For example, the room 2 may be a room of a building, such as an office building, or may be a room (a cabin) of a transport vehicle, such as a railcar or an aircraft. Alternatively, the room 2 may be a room of, for example, a space station, a submersible ship, or a disaster refuge facility.

The air purifying system 1A includes a carbon dioxide removing device 4. In the illustrated example, the carbon dioxide removing device 4 is disposed outside the room 2. However, as an alternative, the carbon dioxide removing device 4 may be disposed inside the room 2.

The carbon dioxide removing device 4 includes a first space 41 and a second space 42, which are divided from each other by a separation membrane 43. The separation membrane 43 selectively allows carbon dioxide to permeate therethrough from the first space 41 to the second space 42.

For example, the separation membrane 43 is a hollow fiber membrane. In this case, a large number of such hollow fiber membranes may constitute a single membrane module, and the carbon dioxide removing device 4 may include a large number of such membrane modules. In the case where the separation membrane 43 is a hollow fiber membrane, the inner side of the hollow fiber membrane is the first space 41, and the outer side of the hollow fiber membrane is the second space 42.

The air in the room 2 is led to the first space 41 of the carbon dioxide removing device 4 through a feed passage 51, and purified air from which carbon dioxide has been removed is led from the first space 41 to the room 2 through a return passage 52. In the present embodiment, the feed passage 51 is provided with an air feeder 53. However, instead of the feed passage 51, the return passage 52 may be provided with the air feeder 53. The air feeder 53 may be a blower or a fan (the same is true of the other air feeders mentioned below).

Sweep gas is led to the second space 42 of the carbon dioxide removing device 4 through a supply passage 61. The carbon dioxide partial pressure in the sweep gas is lower than the carbon dioxide partial pressure in the air in the room 2. In the present embodiment, the sweep gas is outside air, which is the atmosphere outside the room 2. That is, the upstream end of the supply passage 61 is open in the atmosphere.

For example, when the carbon dioxide concentration in the air in the room 2 is 1000 ppm, the carbon dioxide partial pressure in the air in the room 2 is about 0.1 kPa. Meanwhile, when the carbon dioxide concentration in the outside air is 400 ppm, the carbon dioxide partial pressure in the outside air is about 0.04 kPa.

In the second space 42 of the carbon dioxide removing device 4, the sweep gas is mixed with carbon dioxide that has permeated through the separation membrane 43, and the sweep gas mixed with the carbon dioxide is discharged from the second space 42 into the atmosphere through a discharge passage 62. That is, the downstream end of the discharge passage 62 is open in the atmosphere.

In the present embodiment, the supply passage 61 is provided with an air feeder 63. However, instead of the supply passage 61, the discharge passage 62 may be provided with the air feeder 63.

The room 2 is provided with an air conditioner 3, which performs heating and cooling. A first ventilation passage 71 and a second ventilation passage 72 are connected to the room 2.

The room 2 is supplied with the outside air from the atmosphere through the first ventilation passage 71, and the air in the room 2 is discharged into the atmosphere through the second ventilation passage 72. The first ventilation passage 71 and the second ventilation passage 72 are provided with an air feeder 73 and an air feeder 74, respectively.

As described above, in the air purifying system 1A of the present embodiment, the first space 41 and the second space 42 are divided from each other by the separation membrane 43, and a pressure difference occurs between the carbon dioxide partial pressure in the first space 41 and the carbon dioxide partial pressure in the second space 42. As a result, carbon dioxide in the air led to the first space 41 selectively permeates through the separation membrane 43. This makes it possible to purify the air in the room 2 without using a vacuum-drawing pump.

Embodiment 2

Figure 2:
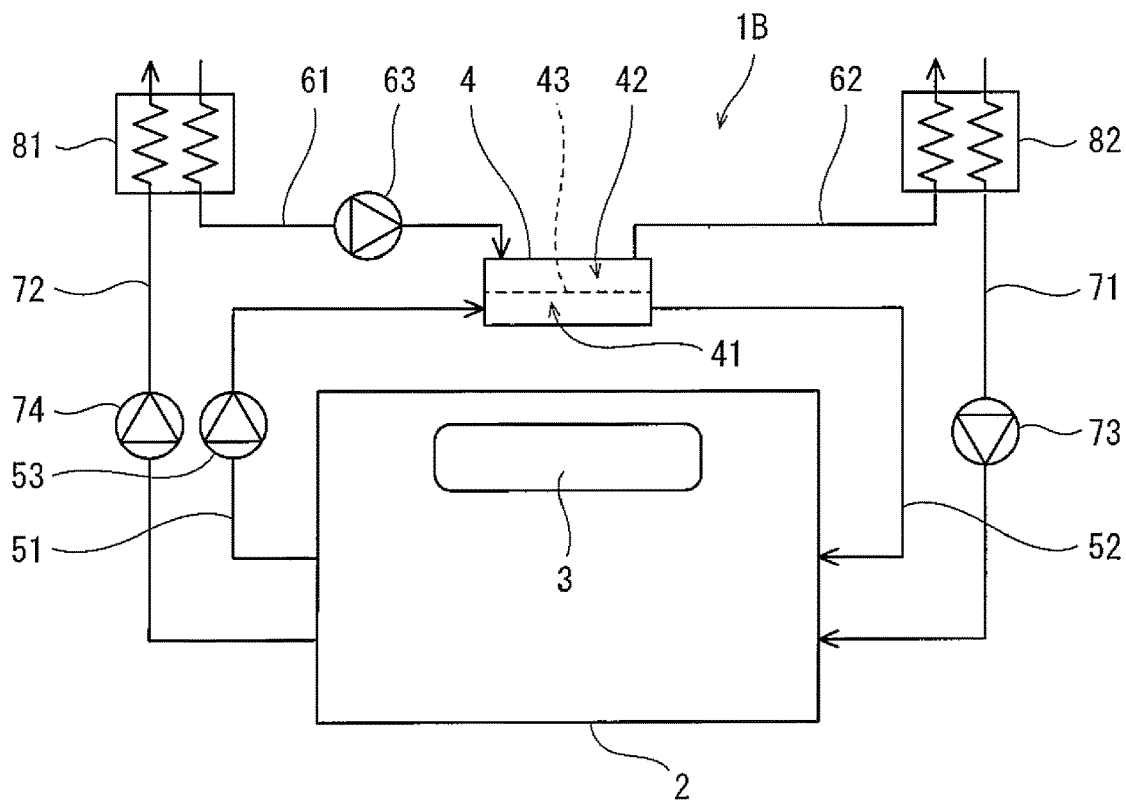
FIG. 2 shows a schematic configuration of an air purifying system according to Embodiment 2 of the present invention.

FIG. 2 shows an air purifying system 1B according to Embodiment 2 of the present invention. It should be noted that, in the present embodiment and the following Embodiment 3, the same components as those described in Embodiment 1 are denoted by the same reference signs as those used in Embodiment 1, and repeating the same descriptions is avoided.

The air purifying system 1B of the present embodiment is a result of adding a first heat exchanger 81 and a second heat exchanger 82 to the air purifying system 1A of Embodiment 1.

The first heat exchanger 81 performs sensible heat exchange between the air that flows through the second ventilation passage 72 and the sweep gas (outside air) that flows through the supply passage 61. The second heat exchanger 82 performs sensible heat exchange between the outside air that flows through the first ventilation passage 71 and the sweep gas that flows through the discharge passage 62.

The present embodiment provides the same advantageous effects as those provided by Embodiment 1. In addition, in the present embodiment, by the sensible heat exchange performed by the first heat exchanger 81, the temperature of the sweep gas supplied to the second space 42 can be brought close to the temperature of the air in the room 2. Consequently, sensible heat exchange via the separation membrane 43 can be suppressed. Further, by the sensible heat exchange performed by the second heat exchanger 82, the outside air supplied to the room 2 through the first ventilation passage 71 can be heated or cooled in advance of being supplied to the room 2.

Desirably, the first heat exchanger 81 performs not only the sensible heat exchange but also latent heat exchange. In this case, if the separation membrane 43 allows not only carbon dioxide but also water vapor to permeate therethrough, the humidity of the air in the room 2 can be suppressed from changing between before and after carbon dioxide is removed from the air in the room 2. It should be noted that latent heat exchange means transfer of water vapor from the higher humidity side to the lower humidity side.

For example, the first heat exchanger 81 may be a total heat exchanger, or may be the combination of a latent heat exchange membrane (water vapor permeable membrane) and a sensible heat exchanger.

Embodiment 3

Figure 3:
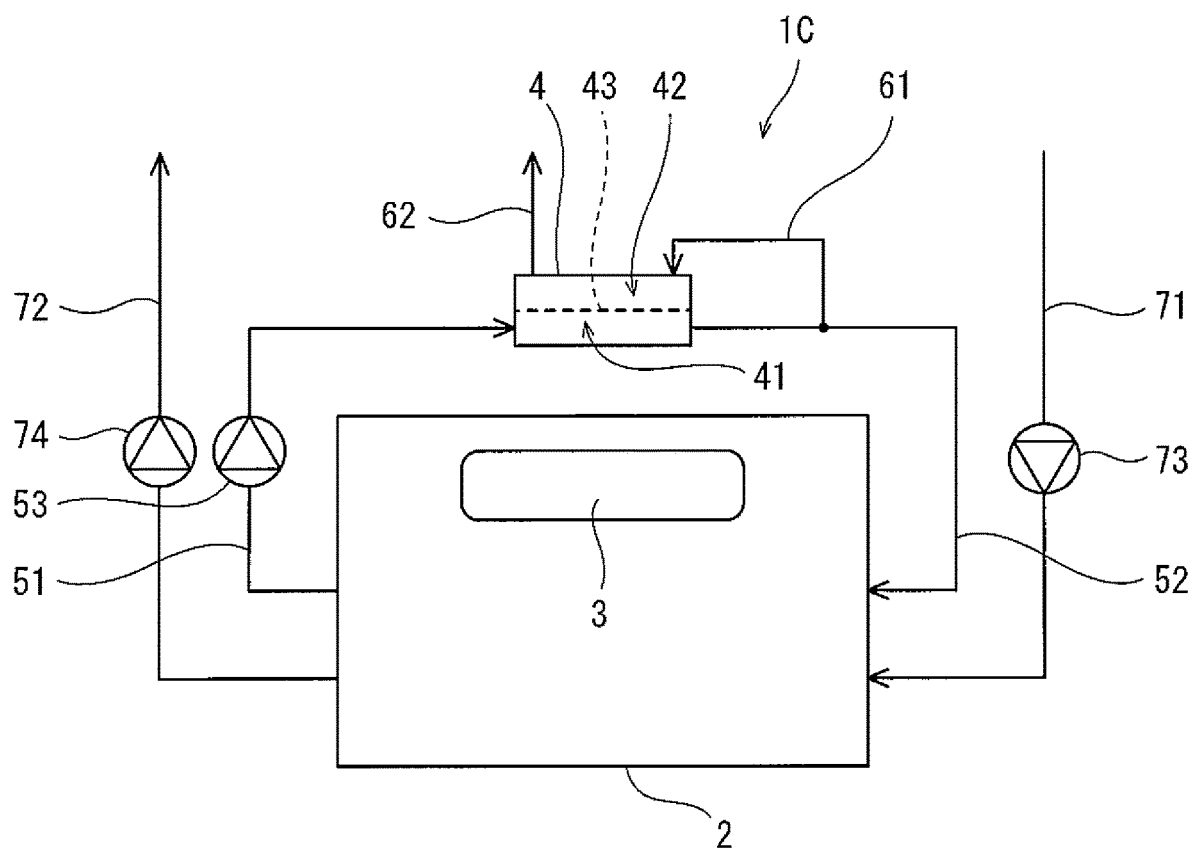
FIG. 3 shows a schematic configuration of an air purifying system according to Embodiment 3 of the present invention.

FIG. 3 shows an air purifying system 1C according to Embodiment 3 of the present invention. In the present embodiment, the upstream end of the supply passage 61 is not open in the atmosphere, but connected to the return passage 52. That is, the supply passage 61 is brandied off from the return passage 52, and the sweep gas is the purified air from which carbon dioxide has been removed.

The present embodiment provides the same advantageous effects as those provided by Embodiment 1. In addition, in the present embodiment, part of the purified air flowing out of the carbon dioxide removing device 4 is utilized as the sweep gas. This makes it possible to simplify the configuration.

Other Embodiments

The present invention is not limited to the above-described embodiments. Various modifications can be made without departing from the spirit of the present invention. For example, it is not essential that the room 2 be provided with the air conditioner 3.

REFERENCE SIGNS LIST 1A to 1C air purifying system
2 room
3 air conditioner
4 carbon dioxide removing device
41 first space
42 second space
43 separation membrane
51 feed passage
52 return passage
61 supply passage
62 discharge passage
71 first ventilation passage
72 second ventilation passage

What is claimed is:

1. An air purifying system for purifying air in a room, the air purifying system comprising:
   a carbon dioxide removing device including a first space and a second space that are divided from each other by a separation membrane that selectively allows carbon dioxide to permeate therethrough;
   a feed passage that leads the air in the room to the first space;
   a return passage that leads purified air from which carbon dioxide has been removed from the first space to the room;
   a supply passage that supplies sweep gas that is outside air to the second space, the sweep gas having a carbon dioxide partial pressure that is lower than a carbon dioxide partial pressure in the air in the room;
   a discharge passage that discharges the sweep gas from the second space after the sweep gas is mixed with the carbon dioxide that has permeated through the separation membrane;
   an air conditioner provided in the room, the air conditioner performing heating and cooling;
   a first ventilation passage that supplies the outside air to the room;
   a second ventilation passage that discharges air from the room; and
   a heat exchanger that performs sensible heat exchange between the air that flows through the second ventilation passage and the sweep gas that flows through the supply passage.

2. The air purifying system according to claim 1, wherein the heat exchanger performs not only the sensible heat exchange, but also latent heat exchange.

3. The air purifying system according to claim 1, further comprising a heat exchanger that performs sensible heat exchange between the outside air that flows through the first ventilation passage and the sweep gas that flows through the discharge passage.

* * * * *